United States Patent
Quenot

[15] 3,680,214
[45] Aug. 1, 1972

[54] LINEAR EXTENSIBLE MEASURING INSTRUMENT WITH TELESCOPIC MEMBERS

[72] Inventor: Andre Quenot, Boite Postale 256, 25 Besancon, Doubs, France

[22] Filed: March 6, 1970

[21] Appl. No.: 17,144

Related U.S. Application Data

[63] Continuation-in-part of Ser. No. 715,695, March 25, 1968, abandoned.

[30] Foreign Application Priority Data

July 24, 1967 France..................67115391

[52] U.S. Cl..................33/169 R, 33/138, 33/161
[51] Int. Cl..................................G01b 3/22
[58] Field of Search..................33/161, 137, 138

[56] References Cited

UNITED STATES PATENTS

| | | | |
|---|---|---|---|
| 3,255,531 | 6/1966 | Anderson | 33/138 |
| 3,203,668 | 8/1965 | Pitsenbarger | 254/15 |
| 2,232,824 | 2/1941 | Maher | 33/161 |

FOREIGN PATENTS OR APPLICATIONS

| | | | |
|---|---|---|---|
| 56,651 | 12/1912 | Austria | 33/137 |
| 1,200,500 | 6/1959 | France | 33/161 |

*Primary Examiner*—William D. Martin, Jr.
*Attorney*—Robert E. Burns and Emmanuel J. Lobato

[57] ABSTRACT

A linear extensible and retractible measuring instrument is provided with telescopic members combined with a casing in which is housed the measuring and reading mechanism. The instrument has a graduated measuring tape guided along a constant path by a suitable guiding means and passing in front of a transparent reading window. The instrument also has locking means for releasably locking the telescopic members in any desired position.

9 Claims, 10 Drawing Figures

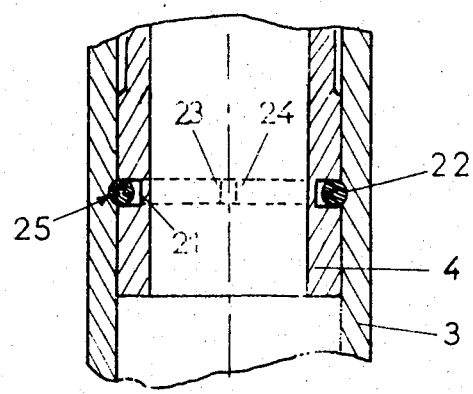
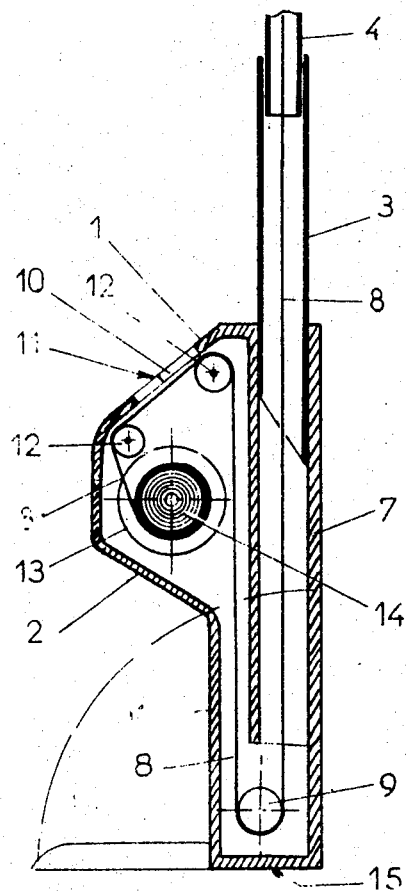

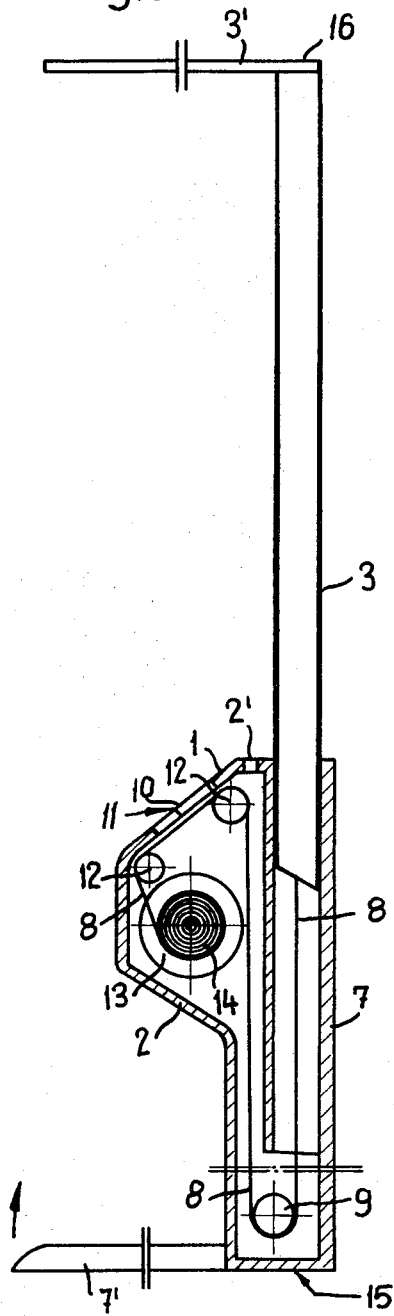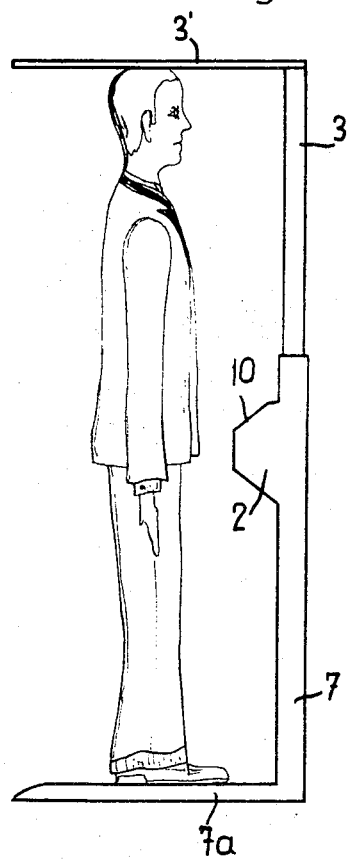

LINEAR EXTENSIBLE MEASURING INSTRUMENT WITH TELESCOPIC MEMBERS

This application is a continuation-in-part application of patent application Ser. No. 715,695, filed Mar. 25, 1968, now abandoned.

The present invention relates to linear extensible measuring instruments of the type having a plurality of rigid telescoping members cooperating with a flexible measuring tape to provide a rapid and accurate determination of linear distances and position relationships by a single operator.

Measuring instruments are known wherein the measuring tape is externally supported on the telescoping supporting members but such an arrangement is undesirable in that during use of the device, the measuring tape is exposed to the harmful influences of dirt and atmospheric particles which cause damage by scratching and which results in a rapid wearing away of the scale marks provided thereon. Typical of these type devices are the measuring devices disclosed in U. S. Pat. Nos. 2,795,050 and 2,846,770 which disclose measuring instruments wherein the measuring indicia are exposed to direct contact with the atmosphere.

It is therefore a principal object of the present invention to provide an improved measuring instrument of the general type referred to above in which the aforementioned drawbacks of the known devices are avoided by means of a novel construction in which either all or at least the essential component parts of the measuring and reading mechanism are protected against damage from atmospheric contaminants.

A further object of the present invention is to provide a measuring device of novel construction readily adaptable for use in a variety of application and arranged to permit an easy and accurate reading of the results of the measurements carried out therewith.

According to one embodiment of the invention, the above objects are attained by means of an instrument comprising a flexible measuring tape which is supported and guided in the interior of the telescoping members and of a casing integral with a guide forming the main telescoping member of the instrument.

According to other aspects of the present invention, the above objects are attained by means of various types of measuring and reading mechanisms, the essential component parts of which are located in the interior of the telescoping members and of a casing integral with a guide forming the main telescoping member of the instrument.

The specific structural features of the measuring instruments of the present invention will now be more fully described in conjunction with the accompanying drawings, in which:

FIG. 1 is a schematic cross-sectional view of a first embodiment of the invention.

FIG. 2 is a fragmentary cross-sectional view of two consecutive telescoping members with a ball and groove guiding.

FIGS. 3–7 represent fragmentary cross-sectional views of various structures for interlocking two consecutive telescoping members.

Figure 4:
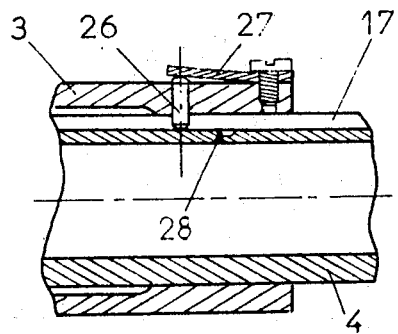

FIG. 8 comprises schematic views 8a, 8b, and 8c of instruments according to the invention having T-squares secured to one or both extremities thereof.

FIG. 9 represents a cross-sectional view of an embodiment of the invention adapted to measure the size of persons.

FIG. 10 schematically illustrates the use of the instrument shown in FIG. 9.

Referring to FIG. 1, the linear measuring instrument 1 comprises a body or casing 2 in which is contained the reading device. This casing 2 also houses a plurality of movable telescoping members 3, 4, 5 and 6, having, respectively, decreasing diameters. The movable member 3 slides in a guide 7 formed integral with the casing 2. Alternatively, the guide 7 can be replaced by a separate member, similar to members 3, 4, 5, 6, secured in the casing 2.

In a modification, the casing 2 may be replaced by a casing containing therein the reading and winding device and which is secured on the first telescoping member 3 having the largest diameter. In this case, the tape portion 8' is protected by a hood of a suitable material and thus it is possible to avoid moulding too large a casing. The roller 9 can be secured to the base of the telescoping element 3.

The reading device includes a transparent reading window 10 provided with a marker 11. The tape is guided in front of the window 10 preferentially by rotatably mounted rollers 12, but fixed guide ribs can also be used. After passing in front of the window 10, the tape 8 winds on a reel 13 which is provided with a rewinding spring 14. The tape 8 thus follows a constant path before reaching the reading window 10 which thus indicates by a suitable graduation the distance separating the base 15 of the casing 2 defining one measuring point (or member 3) from the end tip 16 of the member 6 defining another measuring point.

The guiding of the tape 8 can take place by any means or combination of means such as grooves, ribs, rollers, rolls or other wise. Similarly, the path of the tape inside the casing 2 can assume any trajectory. The tape can also be perforated and pass on toothed sprocket wheels.

The rewinding spring 14 functions, in addition to rewinding the tape 8, to suitably tension the tape 8 along its path of travel. It is also possible to employ a spring of sufficient strength to ensure the reentry of the telescoping members 3, 4, 5 and 6 in the casing 2 when these members are not temporarily immobilized by a pawl and ratchet device or other locking means. Any conventional braking device can be used to ensure the uniformity of the tape reentry.

The reading window 10 is preferably located at a substantial distance from the base of the instrument in order to permit easy reading regardless of the position of the instrument. The window 10 is preferably oblique in order to avoid the necessity of the user from bending down to observe vertical measurements. Alternatively, the window can be placed at other positions on the casing 2 of the instrument, for example at points 10' or 10'' located on rectilinear parts of the casing.

An interesting variation of the present invention consists in disposing the winding casing on the base of the element 3 and providing a reading window in this element. It is thus possible to avoid using guiding and return systems and at the same time decrease the bulk of the device. By giving a suitable shape to the telescoping members 4, 5 and 6 or by limiting their movement, it is possible to avoid closing the window when the same are retracted.

The measurements read on the tape through the window are always exact regardless of the relative position of the different telescoping members. It is sometimes useful to be able to lock these elements in their extended positions in order to hold a measurement so as to add it or to compare it to another distance.

In the embodiment shown in FIG. 2, the cross-sections of telescoping member 3, 4, 5 and 6 are circular. The member 4 (shown by way of example) is provided with an outer longitudinal groove 17 which cooperates with a ball 18 placed in a housing in the inner surface of the member 3.

By such an arrangement, rotation of the member 4 relative to the member 3, which would make incorrect readings due to the twisting of the tape 8, is thus avoided.

The sliding of the telescoping members is effected by means of a split ring 19 preferably made of self-lubricating material, for example of the material sold under the trademark Delrin or Nylon. The ring 19 is attached to the end of the member 4 which is inserted into the member 3. A second split ring 19' is attached to the end of the member 3 receiving the member 4 and also functions to ensure minimal friction between the two members. The ring 19' is provided with an aperture accommodating the ball 18.

A waterproof, frictional washer 20 is also provided in order to prevent the introduction of foreign matter inside the member 3 which would interfere with a sliding of the telescopic members.

It is also possible to use telescoping members, such as 3, 4, 5 and 6, of cross-sections other than circular, for example rectangular. Such shapes permit elimination of the ball 18 or equivalent devices since their configuration effectively prevents mutual rotation of the members.

It is also possible to eliminate the sliding rings, such as 19 and 19', and to have sliding of the telescoping members directly through the inner and outer surfaces of the telescoping members. However in this case, the surface frictional characteristics vary and the choice of such a solution will thus depend on the frictional properties of the material, metallic or otherwise, forming the telescoping members.

It is possible to use these various frictional properties to impart to the telescoping members 3, 4, 5 and 6 a preferential order of exit and entrance. Thus, for example, by pulling on extremity 16, the user will firstly cause the member 6 to extend, then the members 5, 4 and 3. Reentry will occur in a corresponding fashion.

To take a measurement, the telescoping members are initially completely withdrawn and then the final adjustment of the distance is made by sequentially extending the members until they span the distance which is to be measured. For this purpose, it is advantageous to provide the members 3, 4, 5 and 6 with devices for releasably locking them in their fully withdrawn and/or completely extended position or locking devices to immobilize them in any chosen position.

FIG. 3 shows one type of locking device wherein the telescoping member 4 is provided at its innermost end with an annular groove 21 in which is disposed a circular spring 22 having extremities 23 and 24. The circular spring 22 is compressed into the groove 21, but is prevented from expanding outwardly by contacting the inner surfaces of the member 3. The inner surface is provided, towards the outermost extremity of the member 3, with a shallow circular groove 25. When the members 3 and 4 are moved with respect to each other such that the grooves 21 and 25 face one another, the spring 22 penetrates into the groove 25 and releasably locks together the members 3 and 4.

Referring to FIG. 4, a modified locking device is shown in which the member 3 is provided with a small arm or projection 26 urged towards the inside of the element 4 by an elastic blade 27. Engagement is produced when the arm 26 comes in front of a small nick or groove 28, located in the bottom of the guide groove 17. The arm 26 permits simultaneous engagement and guiding of the element 4 but it can, of course, be replaced by the ball 18.

Any other locking or holding device can be used, for example, a magnetic pawl and ratchet assembly. It is also possible to use the catch or locking device as a limit stop when the members are fully extended.

It may be advantageous to be able to lock at least one of the telescoping members in any position. Thus, for example, it may be desirable to provide the casing 2 with a locking device premitting the maintenance of the member 3 in any position.

Figure 5:
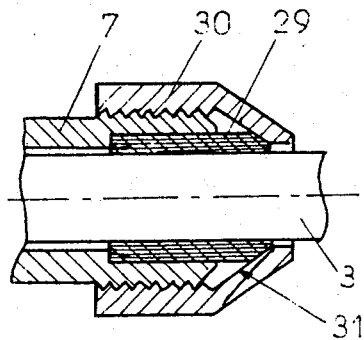

Referring to FIG. 5, the member 3 is mounted for sliding movement in a guide 7 through a split ring 29, which is similar to ring 19, and which is mounted on the guide 7. By screwing a knurled head 30 on the guide 7, the ring 29 is selectively compressed against the member 3 by the action of a cone 31 which terminates the head 30, thereby immobilizing the element 3 at any desired position.

Figure 6:
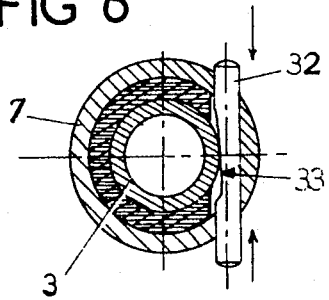

As a modification, according to FIG. 6, locking of the member 3 is effected by a push button 32 having a bevel-shaped portion 33. When the button 32 is depressed inwardly, it acts directly on the member 3 to lock it in place and the locking effect can be released by manually moving the button 32 to its center position. Naturally, such a device can be disposed on the other telescoping members as well.

Figure 7:
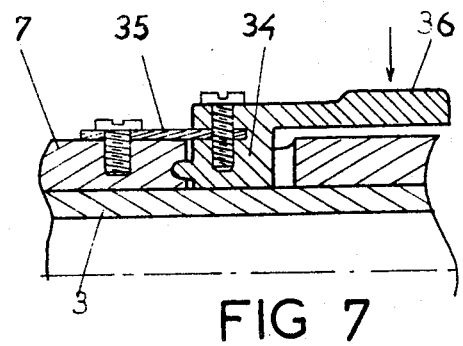

Another solution, represented in FIG. 7, comprises a push button 34 which an elastic blade 35 tends to move away from the member 3. To lock the member 3 in place, it suffices to push on the button 36.

Naturally, many other locking devices can be used such as a collar tightened by a butterfly screw. Devices can be provided to lock several of the members or only one of the members. It is also possible to replace the catch devices by such devices having manual controls, for example, a manually operated device for rendering the catch ineffective.

As a modification, the extension as well as the retraction of the telescoping members 3, 4, 5 and 6 can take place by means of an electric motor. The reading can be provided by a graduated tape or by any other suitable reading device.

The linear measuring instrument according to the present invention can be provided with various improvements. It can, for example, comprise a foldable foot 46' (FIG. 1) intended to form a T-square. It is also possible to provide the upper end 16 with a hook in order to more readily effect external measurements.

Figure 8A:
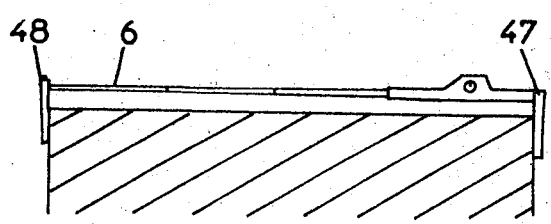
Figure 8C:
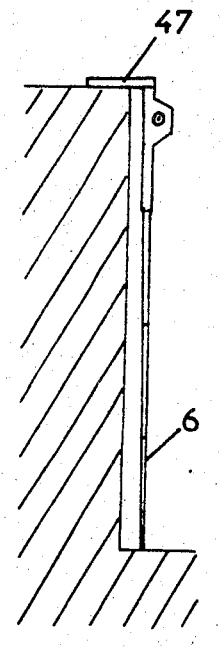
Figure 8B:
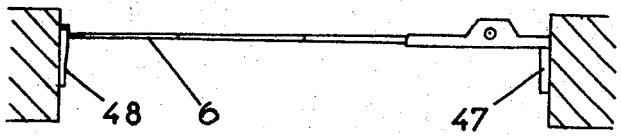

It is possible to replace the foot 46' by a removable T-square 47 (FIG. 8). It is also possible to secure a foldable T-square 48 similar to the T-square 47 to the upper telescoping member 6. The instrument can thus be used to effect outer measurements (FIG. 8a), inner measurements (FIG. 8b) and depth measurements (FIG. 8c).

It is possible to dispose on the casing 2 one or more spirit levels, and the casing 2 can also include a handle to facilitate its use. It is also possible to light the reading window by a suitable light source. The instrument can also be provided with magnets for magnetically fastening it to a metallic support.

FIGS. 9 and 10 depict a further embodiment of the present invention adapted to measure the size of persons. The measuring instrument in this embodiment comprises a casing 50 made integral with a tubular guide 51 in which is housed a single tubular or solid telescoping member 52. The casing 50 has an oblique upper side wall 53 in which is provided a reading window 54 including a marker 55. To the lowermost end of the telescoping member 52 is secured one end of a flexible measuring tape 56, the other end of which is mounted on a reel 57 provided with a rewinding spring 58 and which is rotatably mounted in the casing 50. Between the member 52 and the reel 57, the tape 56 is passed over a return roller 59 located in the base of the casing 50 and two further rollers 60 are positioned in the upper front portion of the casing 50 in such a manner that the tape 56 is guided by the rollers 60 along the window 54. To the base of the casing 50 is pivoted a folding foot 61 and to the free upper end 62 of the telescoping member 52 is secured a horizontal stop member 63. The instrument is further provided with a spirit level 64 mounted in a horizontal portion of the upper side of the casing 50.

In FIG. 10, the practical application of the instrument for measuring the size of a person is schematically illustrated. The size of the person being measured can be directly read by the user through the oblique window 54.

The strength of the rewinding spring 58 is preferably chosen so that not only is the tape 56 properly stretched when in its unwound position, but the spring further tensions the tape sufficiently to impart a suitable retracting force on the telescoping member 52 which in turn can be locked in its extended position by means of any suitable locking device (not shown) of any one of the above-described types.

Although the invention has been described with respect to certain specific embodiments thereof, the same is in no way limited to the disclosed embodiments and various modifications as to the shape and the materials used may be made without departing from the scope of the invention.

What I claim and desire to secure by Letters Patent is:

1. A linear measuring instrument comprising: an elongated casing having an end portion defining one measuring point; at least one telescoping member having an end tip defining another measuring point; means telescopingly mounting said telescoping member for partial extension from said casing to linearly bridge a linear distance to be measured by said measuring points and for retraction into said casing; a transparent window in said casing positioned at an angle with respect to the direction of telescoping movement of said telescoping member; a roll of measuring tape mounted for unwinding and winding movement within said casing and having one end connected to an end of said telescoping member whereby extension of said telescoping member effects unwinding of said roll of measuring tape; tape guiding means including a pair of rotatable rollers disposed interiorly of said casing on opposite sides of said transparent window for guiding said measuring tape past said transparent window during extension of said telescoping member; means for automatically rewinding said measuring tape during retraction of said telescoping member; linear measuring indicia on said measuring tape providing a direct indication beneath said transparent window of the linear distance existing between said measuring points; and locking means for releasably locking said telescoping member in any desired extended position.

2. An instrument according to claim 1; wherein said at least one telescoping member comprises a plurality of rigid telescoping members mounted for extension and retraction relative to each other, the outermost telescoping member being telescopingly mounted within said casing and the innermost telescoping member being connected to said one end of said measuring tape.

3. An instrument according to claim 2; including means for preventing relative angular movement of said plurality of telescoping members in a plane perpendicular to the telescoping direction of said telescoping members.

4. An instrument according to claim 3; wherein said last-mentioned means comprises a longitudinal groove in an outer telescoping member, a recess in the inner surface of the surrounding telescoping member, and a ball disposed between said outer and surrounding telescoping members cooperative with said groove and recess to prevent relative rotation between said outer and surrounding telescoping members.

5. An instrument according to claim 1; wherein said transparent window extends obliquely with respect to the direction of extension and retraction of said telescoping member to enable reading of said measuring tape at a location adjacent said end tip of said telescoping member.

6. An instrument according to claim 1; including a foldable T-square connected to said end portion of said casing and another foldable T-square connected to said end tip.

7. An instrument according to claim 6; wherein said transparent window extends obliquely with respect to the direction of extension and retraction of said telescoping member to enable reading of said measuring tape at a location adjacent said end tip of said telescoping member.

8. An instrument according to claim 7; wherein said transparent window is positioned adjacent said end tip of said telescoping member when same is fully retracted thereby facilitating the reading of said measuring tape.

9. An instrument according to claim 1; wherein said end portion of said casing extends perpendicularly outwardly from the remainder of said casing and is dimensioned to enable a person whose height is to be measured to stand thereon, whereby the person is positioned between said measuring points.

* * * * *